United States Patent

[11] 3,619,509

[72] Inventors James Robert Barger
Haddon Heights;
Phillips Brooks Scott, Haddonfield, both of N.J.

[21] Appl. No. 845,987
[22] Filed July 30, 1969
[45] Patented Nov. 9, 1971
[73] Assignee RCA Corporation

[54] BROAD SLOPE DETERMINING NETWORK
10 Claims, 6 Drawing Figs.

[52] U.S. Cl. .......... 179/15 A
[51] Int. Cl. .......... G10l 1/02
[50] Field of Search .......... 179/1 AS; 307/201; 324/57 Q, 77 E; 328/132

[56] References Cited

UNITED STATES PATENTS

| | | | |
|---|---|---|---|
| 3,211,832 | 10/1965 | Putzrath | 179/1 AS |
| 3,237,025 | 2/1966 | Clapper | 307/201 |
| 3,394,351 | 7/1968 | Martin | 307/201 |
| 3,454,876 | 7/1969 | Huang | 179/1 AS |

*Primary Examiner*—Kathleen H. Claffy
*Assistant Examiner*—Jon Bradford Leaheey
*Attorney*—E. J. Norton

ABSTRACT: A network which determines whether the slope of a pattern, representing an input signal, is positive going or negative going in selected portions of the pattern. The existence of positive or negative slopes is determined by sampling amplitude components from a sequence of channels representing the pattern and then comparing a plurality of adjacent components with a successive plurality of adjacent components to decide whether the amplitude of the pattern is increasing or decreasing in selected portions of the pattern. Signals, compatible with digital circuitry, are provided to indicate the existence of positive and negative slopes. The invention herein described was made in the course of or under a contract or subcontract thereunder with the department of the Air Force.

INVENTORS
James R. Barger
Phillips B. Scott
BY Edward J. Norton
ATTORNEY

| BPS | $=(E_{N+2}+E_{N-1}) - (E_{N-1}+E_N)$ | CHANNEL TIME INTERVAL |
|---|---|---|
| BPS | ($E_3$ + $E_2$) − (0 + $E_1$) | 3 |
| | ($E_4$ + $E_3$) − ($E_1$ + $E_2$) | 4 |
| | ($E_5$ + $E_4$) − ($E_2$ + $E_3$) | 5 |
| | ($E_6$ + $E_5$) − ($E_3$ + $E_4$) | 6 |
| | ($E_7$ + $E_6$) − ($E_4$ + $E_5$) | 7 |
| | ($E_8$ + $E_7$) − ($E_5$ + $E_6$) | 8 |
| | ($E_9$ + $E_8$) − ($E_6$ + $E_7$) | 9 |
| | ($E_{10}$ + $E_9$) − ($E_7$ + $E_8$) | 10 |
| | ($E_{11}$ + $E_{10}$) − ($E_8$ + $E_9$) | 11 |
| | ($E_{12}$ + $E_{11}$) − ($E_9$ + $E_{10}$) | 12 |
| | ($E_{13}$ + $E_{12}$) − ($E_{10}$ + $E_{11}$) | 13 |
| | ($E_{14}$ + $E_{13}$) − ($E_{11}$ + $E_{12}$) | 14 |
| | ($E_{15}$ + $E_{14}$) − ($E_{12}$ + $E_{13}$) | 15 |
| | ($E_{16}$ + $E_{15}$) − ($E_{14}$ + $E_{15}$) | 16 |
| BPS | (0 + $E_{16}$) − ($E_{15}$ + $E_{16}$) | 1 |

Fig. 3

| BNS | $=(E_{N-1}+E_N) - (E_{N+1}+E_{N+2})$ | CHANNEL TIME INTERVAL |
|---|---|---|
| BNS | (0 + $E_1$) − ($E_2$ + $E_3$) | 3 |
| | ($E_1$ + $E_2$) − ($E_3$ + $E_4$) | 4 |
| | ($E_2$ + $E_3$) − ($E_4$ + $E_5$) | 5 |
| | ($E_3$ + $E_4$) − ($E_5$ + $E_6$) | 6 |
| | ($E_4$ + $E_5$) − ($E_6$ + $E_7$) | 7 |
| | ($E_5$ + $E_6$) − ($E_7$ + $E_8$) | 8 |
| | ($E_6$ + $E_7$) − ($E_8$ + $E_9$) | 9 |
| | ($E_7$ + $E_8$) − ($E_9$ + $E_{10}$) | 10 |
| | ($E_8$ + $E_9$) − ($E_{10}$ + $E_{11}$) | 11 |
| | ($E_9$ + $E_{10}$) − ($E_{11}$ + $E_{12}$) | 12 |
| | ($E_{10}$ + $E_{11}$) − ($E_{12}$ + $E_{13}$) | 13 |
| | ($E_{11}$ + $E_{12}$) − ($E_{13}$ + $E_{14}$) | 14 |
| | ($E_{12}$ + $E_{13}$) − ($E_{14}$ + $E_{15}$) | 15 |
| | ($E_{13}$ + $E_{14}$) − ($E_{15}$ + $E_{16}$) | 16 |
| | ($E_{14}$ + $E_{15}$) − ($E_{16}$ + 0) | 1 |

Fig. 4

INVENTORS
James R. Borger
Phillip B. Scott
BY
Edward J. Norton
ATTORNEY

INVENTORS
James R. Borger
Phillip B. Scott
BY
Edward J. Norton
ATTORNEY

INVENTORS
James R. Barger
Phillip B. Scott
BY
Edward J. Norton
ATTORNEY

BROAD SLOPE DETERMINING NETWORK

This invention relates to pattern recognition systems and is especially applicable to speech recognition systems. In such recognition systems information may be obtained by identifying certain primary or class features of the complex input signal such as peaks and dips at certain points in the signal and the general trend of the slope in certain areas of the input signal.

The input signal wave may represent any pattern which contains predetermined class feature information. Such a pattern might result from optical tracing, as would be the case in a writing or character recognition system. In a speech recognition system the input signal is the amplitude-frequency spectrum derived from the formants of a spoken word. The spectrum, in speech recognition systems, is usually derived by passing the speech waveform through a bank of band-pass filters.

The spectrum of a spoken word can be characterized by certain time varying primary features, such as the slopes of the spectrum in certain ranges of frequency. Though the frequency locations and the amplitude levels of peaks and dips in the spectrum of a particular word or sound may vary somewhat from speaker to speaker, the overall characteristics of the spectrum remain reasonably constant for a fairly wide range of speakers. For example, the vowel sound in the word "Bed" is characterized by an amplitude-frequency spectrum which is generally decreasing in amplitude from about 260 Hz. to 3,000 Hz. The sound may therefore be identified by its generally negative slope with small areas of increasing slope interspersed in specific frequency ranges. When the slope characteristics of a speech sound are identified and correlated with the prior knowledge of the spectrum of that sound, the difficult problem of recognizing the sound is solved with a minimum of circuitry.

One of the problems in the known speech recognition systems is the complexity of the circuitry and the resulting large volume taken up by the system. The volume of the circuitry is principally a result of processing the input speech sounds with analog techniques.

The present invention provides signal indications of increasing or decreasing slopes, representing portions of the pattern under investigation, which are compatible with digital circuitry.

The invention described herein is a network which has been adapted to receive at least N channels of information which represent an input signal pattern. The input signal pattern is characterized by a first parameter (such as amplitude) which is a function of a second parameter (such as frequency). Contained in each one of the plurality of the N channels is a first parameter component which is representative of all the first parameter components of the input pattern in the range of second parameters corresponding to each of the channels. There are a total of *n* first parameter components, *n* being a number in the range of one to N.

The *n* channels containing first parameter components, coupled to the input of the network, are sequentially sampled in order to extract the first parameter components. Structure is then provided to generate a signal when the sum of a plurality of components sampled from adjacent channels exceeds a second sum of a plurality of components sampled from successive adjacent channels, by a predetermined threshold level. This generated signal indicates the existence of a positive slope in the broad range of second parameters comprising the channels corresponding to the first and second sums of first parameter components analyzed. In a like manner the structure provides a signal when the second sum of components exceeds the first sum of components by a predetermined threshold level to indicate the presence of a negative slope in the range of second parameters comprising the channels corresponding to the first and second sums of components analyzed.

In the drawings:

FIG. 3 is a table showing the manner in which broad positive slopes, in selected portions of the spectrum, are determined;

FIG. 4 is a table showing the manner in which broad negative slopes, in selected portions of the spectrum, are determined;

The determination of broad slopes is extremely useful in any pattern recognition system. In systems designed to recognize a limited number of patterns it is feasible to use slope determination alone to recognize the individual patterns.

Figures 1, 2:
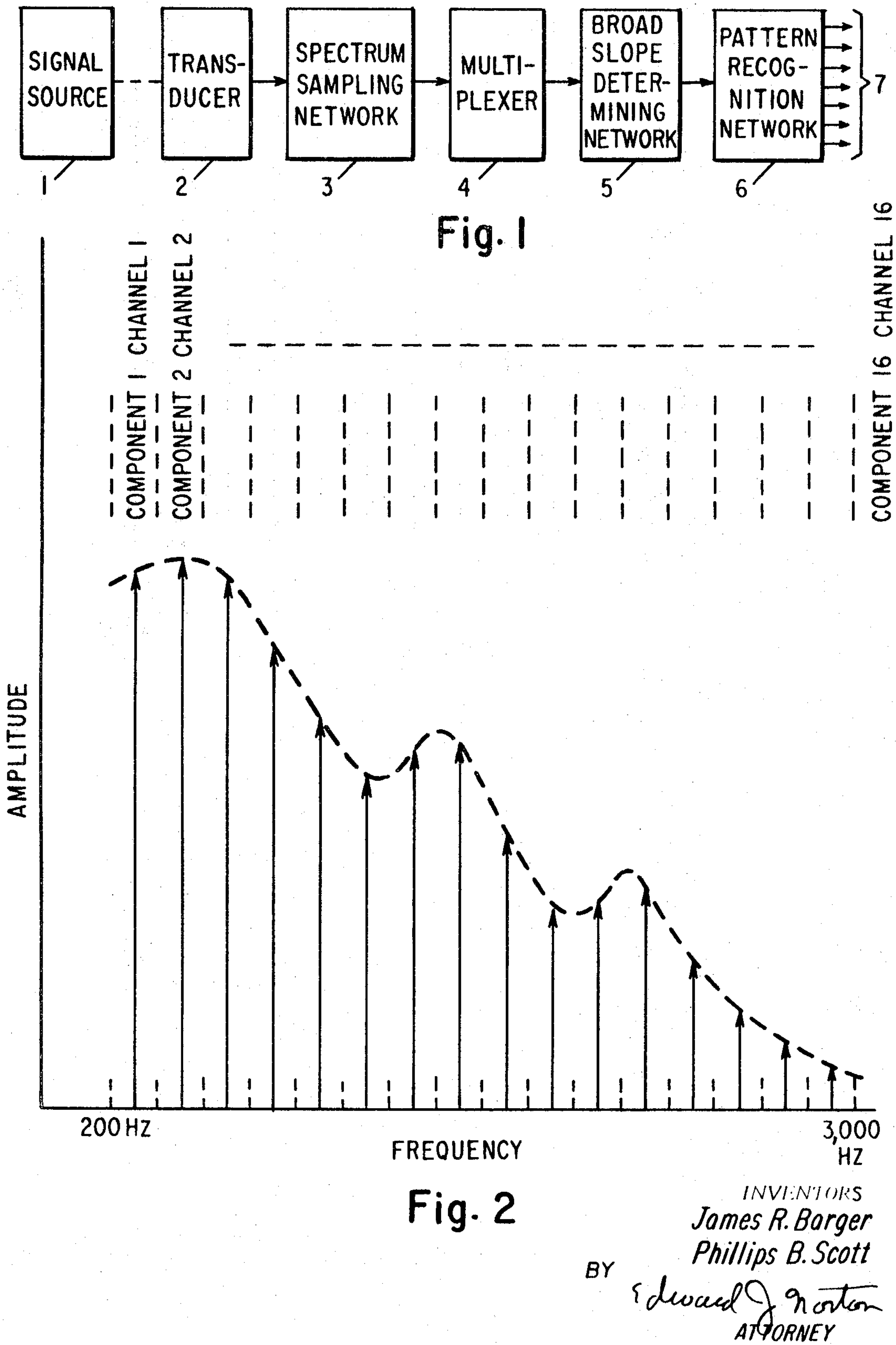
FIG. 1 is a block diagram of a system employing a broad slope determining network.
FIG. 2 is a representation of an input spectrum pattern as seen by the broad slope determining network.

Referring now to FIG. 1, the slope determination network is shown in conjunction with a speech recognition system.

In most speech recognition systems the basic approach is to generate the amplitude-frequency spectrum of the speech sounds and then process the signals representing the spectral properties utilizing predetermined knowledge of the spectral characteristics of the speech sounds or words.

In FIG. 1 the speech sound is generated at a signal source 1 which may be a live speaker, a taped recording or any other source of speech. The transducer 2, which may be a microphone or a magnetic head translates the speech sounds into a time varying electrical signal. The time varying signal is then coupled to a spectral sampling network 3 where the amplitude-frequency spectrum of the input sound is derived. The spectral sampling network 3 usually comprises a bank of band-pass filters with each filter coupled to a full wave rectifier. The output terminals of each one of the filters are connected to a multiplexer unit 4 where the full wave rectified output signals from the spectrum sampling network 3 are transferred to a single line, with each output signal occupying one channel time interval. One channel time interval is allocated for each filter; however, there may be additional channel time intervals, other than those occupied by the filtered output signals, also multiplexed in multiplexer 4.

In the system shown in FIG. 1, the broad slope determining network 5 responds to a time multiplexed signal representing the spectrum of the input speech sound in a consecutive sequence of channels. The broad slope determining network 5 analyzes the information in each channel coupled into the network and extracts an amplitude-frequency information signal from each channel. By utilizing the extracted amplitude-frequency information signals, the broad slope determining network 5 determines if selected portions of the spectral pattern have positive slopes (increasing amplitude components), or negative slopes (decreasing amplitude components).

Each time a determination of slope is made by the broad slope determining network 5, a signal is provided to the pattern recognition network 6. The pattern recognition network 6 utilizes the predetermined knowledge of the slope characteristic in selected portions of the spectrum of the input speech to identify that input speech formant. In more complex systems, additional characteristics of the spectrum may also be utilized in the sound identification process. Once the speech sound has been identified, it may be combined with other speech sounds in the spoken word to complete word identification. With the input word identified, the pattern recognition system 6 generates a corresponding signal on one of the output lines 7 so that a machine can be controlled, a narrow band communications system may be made possible, or any other of the myriad of uses of speech recognition may be accomplished.

The preferred embodiment of the invention is to be used in a speech recognition system as shown in FIG. 1 where there are 16 band-pass filters in the spectrum sampling network 3. There can, of course, be greater or fewer numbers of filters as determined by the system requirements. For each filter there is a channel time interval allocated in the multiplexer unit 4.

In the dashed line representation of the input spectrum envelope shown in FIG. 2, the 16 channels encompassing the frequency range of the bank of band-pass filters in the spectrum sampling network 3 are shown. The spectrum is represented by the amplitude levels of the signal waves contained in each channel. The amplitude-frequency components representing amplitude levels are shown as the vertical arrows in FIG. 2.

In order to determine broad positive slopes, the broad slope determining network 5 performs the following mathematical function:

Broad Positive Slope $=(E_{n+2}+E_{n+1})-(E_{n11}+E_{n})$ where the E's represent the amplitude levels of the amplitude-frequency components, shown as the vertical arrows in FIG. 2, and the subscript $n$ refers to the channel time interval from which the amplitude-frequency component has been abstracted. Subscript $n$ may take on any value in the range of 1–16. The broad positive slope is then determined in the portions of the spectrum in the range of channels ($n$+2) to ($n$—1) (n—.

The equation for the broad positive slope determination indicates that a test is made to decide whether the sum of two amplitude-frequency components in adjacent channels exceeds the sum of the two adjacent preceding amplitude-frequency components by a certain amount. Alternatively, the equation is used to decide if the spectrum is increasing in amplitude in the range of frequencies contained in channels ($n$—1 ) to ($n$+2). The invention is, of course, not limited in the number of amplitude-frequency components that may be used in the two sums in the equation for the broad positive slope determination.

In FIG. 3 the equation for the broad positive slope determination is given along with a table of the amplitude-frequency components used to determine the existence of broad positive slopes as the spectrum is traversed from channel time interval 1 to channel time interval 16. It should be noted that the existence of broad positive slopes is determined 15 times when the system provides 16 channel time intervals containing amplitude-frequency components. The 16th determination would have no first sum ($E_{17}+E_{18}$) to compare to the second sum ($E_{15}+E_{16}$).

FIG. 4 is very similar to FIG. 3 and shows the equation for broad negative slope determination namely;

Broad negative slope $=(E_{n11}+E_{n})-(E_{n+1}+E_{n+2})$.

All of the comments made with respect to the broad positive slope determination are equally applicable to the broad negative slope determination. However, in the broad negative slope determination the equation determines if the spectrum is decreasing in amplitude in the range of frequencies included in channel time intervals ($n$—1) to ($n$+2)

Figure 5:
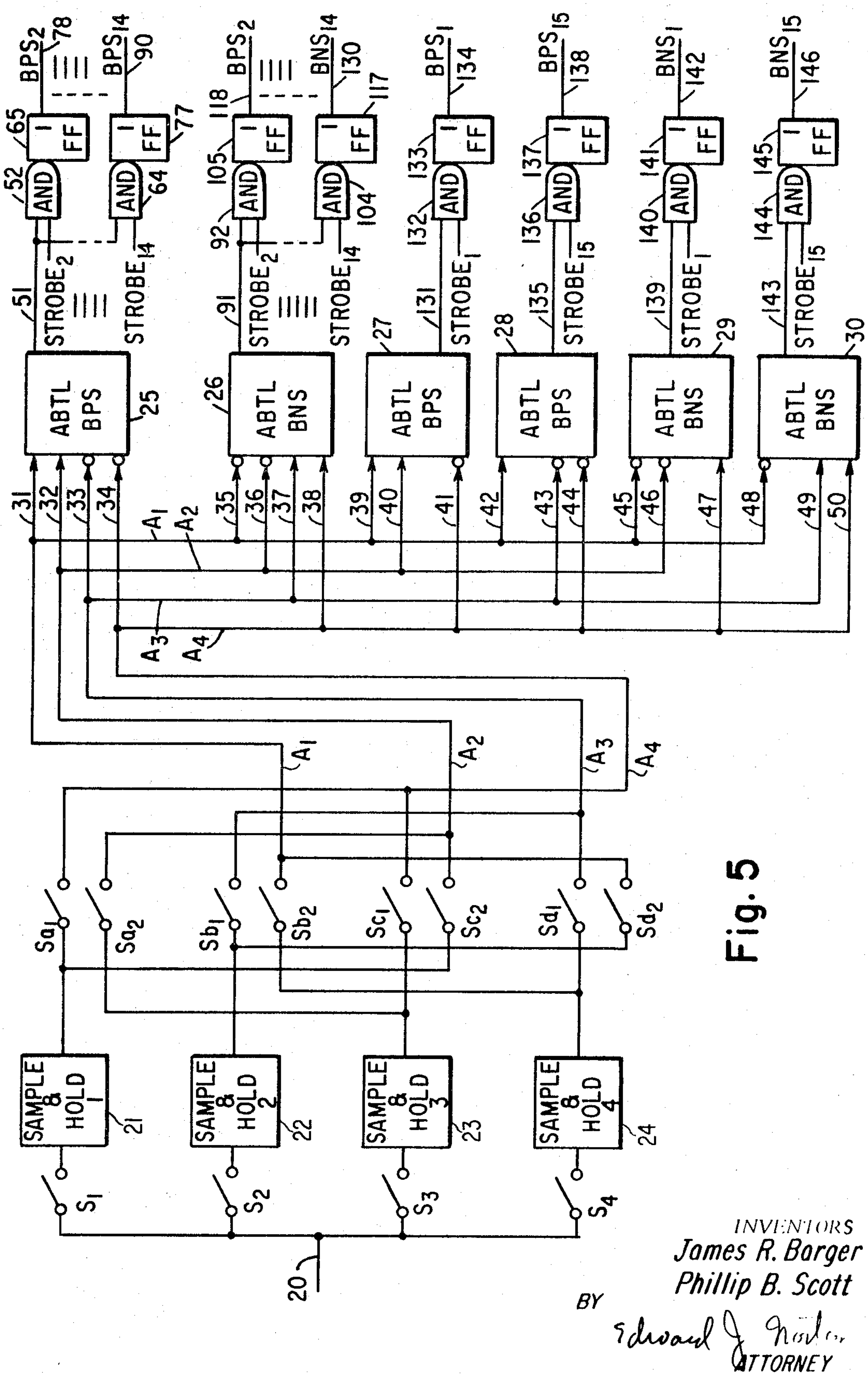
FIG. 5 is a combination block and schematic diagram of the broad slope determining network shown in FIG. 1.

Having defined the function of the broad slope determining network 5 in terms of the type of input signals coupled thereto and the type of signal processing performed on the input signal, the structural implementation of the broad slope determining network 5 is provided, as shown, in FIG. 5. As an aid to the description of FIG. 5, the timing diagram of FIG. 6 will be referred to at appropriate times.

The first function of the broad slope determining network 5 is to extract the amplitude-frequency information during each channel time interval containing amplitude-frequency information in the multiplexed input signal. In FIG. 5, the multiplexed channels are coupled to the broad slope determining network 5 from the multiplexer 4 via line 20. FIG. 6a shows the channel time intervals allocated to each of the 16 channels. FIG. 6a shows that the multiplexer 4 sequentially provides channels 1–16, corresponding to the output signals of the 16 filters in the spectrum sampling network 3, and then restarts the cycle at channel 1 to continue the multiplexing process.

Figure 6:
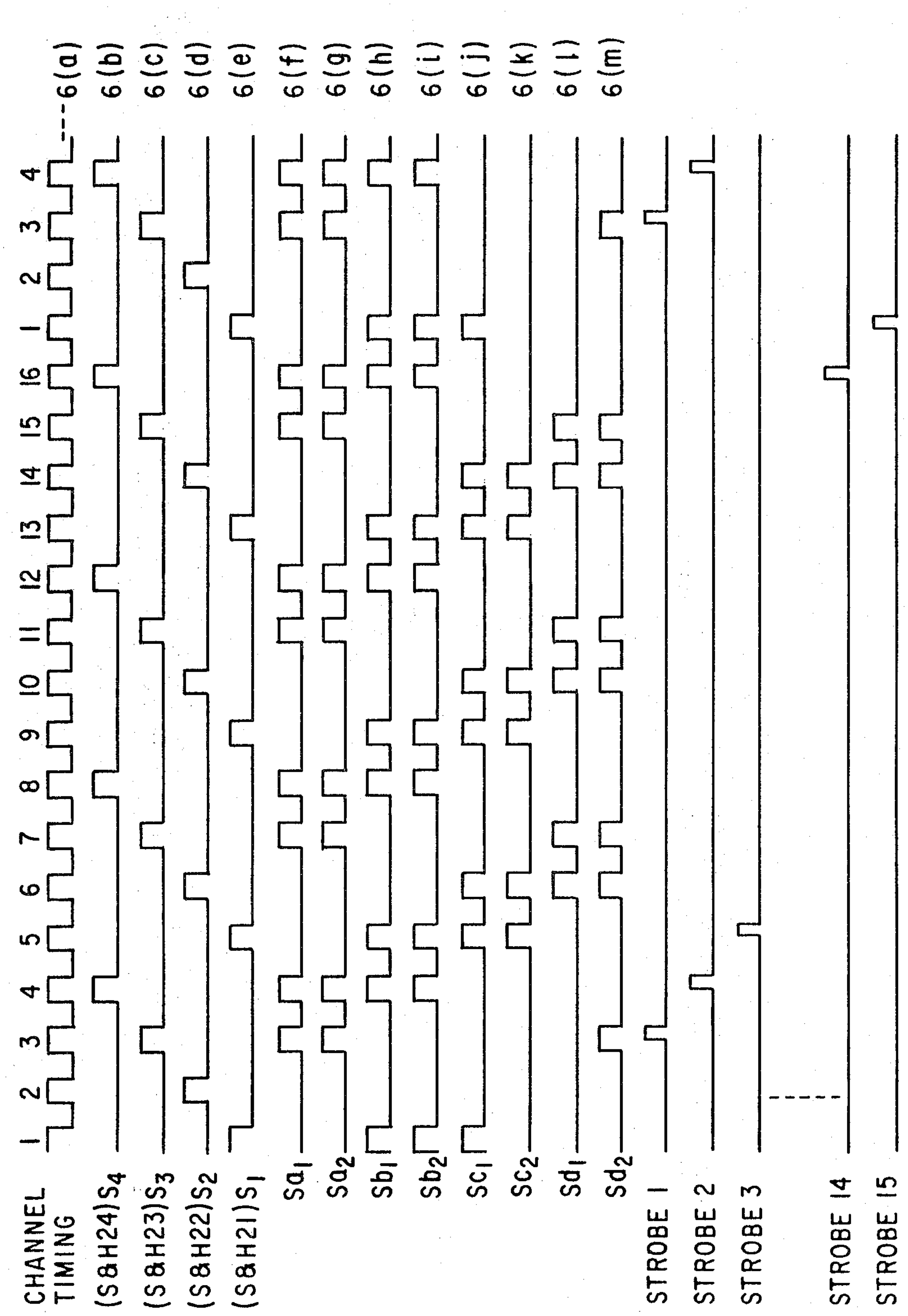
FIG. 6 is the timing diagram of the broad slope determining network.

With the input multiplexed signal on line 20, switches $S_1$, $S_2$, $S_3$ and $S_4$, each coupled to line 20, are sequentially closed to pass the input signals occurring in each channel time interval. Switches $S_1$–$S_4$ are normally open modulo four switches, and each switch is closed every fourth channel time interval. FIGS. 6($b$), 6($c$), 6($d$) and 6$e$) show the timing signals for switches $S_4$, $S_3$, $S_2$ and $S_1$ respectively, where the occurrence of a pulse corresponds to the closing of the associated switch FIG. 6($e$) shows that switch $S_1$ passes the signals in channels 1, 5, 9 and 13 and then passes the signals in the same relative channels in the succeeding sequence of 16 incoming channels. FIG. 6($d$) shows the same repetitive passing of signals in channels 2, 5, 10 and 14 through switch $S_2$. FIG. 6($c$) shows the same repetitive passing of signals in channels 3, 7, 11 and 15 through switch $S_3$. Completing the cycle, FIG. 6($b$) shows that switch $S_4$ will repetitively pass the signals in channels 4, 8, 12 and 16. With the signals in the channels of the multiplexed waveform thus separated, means are provided to extract an amplitude-frequency component from the signals in each one of the channels.

Coupled to each one of the modulo 4 switches $S_1$, $S_2$, $S_3$ and $S_4$, is a sample and hold circuit respectively labeled 21, 22, 23 and 24. The function of the sample and hold circuits 21–24 is to extract one amplitude-frequency component from the signals in the channels passed by the associated switch and to hold the amplitude level thus sampled until such time as the associated switch is again closed four channel time intervals later. The amplitude levels held are the amplitude-frequency components shown as vertical arrows in FIG. 2. For example, when switch $S_1$ is closed at the channel time interval 1, amplitude-frequency component $E_1$ is extracted and retained in sample and hold circuit 21. At channel time interval 2, amplitude-frequency component $E_2$ is extracted and retained in sample and hold circuit 22. Similarly, amplitude-frequency components $E_3$ and $E_4$ are extracted and retained in sample and hold circuits 23 and 24 respectively at channel time intervals 3 and 4. At channel time interval 5, switch $S_1$ is again closed and channel 5 is sampled. The amplitude-frequency component $E_5$ then replaces $E_1$ in sample and hold circuit 21. The process continues on the four time interval base until all 16 channels have been sampled, whereupon the identical process is initiated starting with channel 1.

With the amplitude-frequency components of the spectrum being continually separated and stored in sample and hold circuits 21–24, the circuitry to be hereafter described provides the implementation of the equations and derived tables for the broad positive slope and the broad negative slope determinations shown in FIGS. 3 and 4 respectively.

The devices used for determining the difference between two sums in the equations for broad positive and broad negative slope determinations are the analog to binary threshold logic (ABTL) elements 25–30 shown in FIG. 5. These devices have "excitatory" and "inhibitory" inputs. Signals coupled to the excitatory inputs of the ABTL units 25–30 are processed as positive signals while the signals coupled to the inhibitory inputs of the ABTL units 25–30 are processed as negative signals. The input terminals to the ABTL units 25–30 in FIG. 5 having circles are the inhibitory input terminals and the input terminals without circles are the excitatory input terminals. Therefore, with respect to ABTL unit 25 the excitatory input terminals are connected to lines 31 and 32 while the inhibitory input terminals are connected to lines 33 and 34. Similar comments apply with respect to the input terminals 35–50 for the remaining (ABTL) units 26–30.

When the sum of the excitatory input signals of one of ABTL units 25–30 exceeds the sum of its inhibitory input signals by a predetermined threshold level, a pulse is generated at the output terminal thereof corresponding to a binary "1." The threshold level is individually set for each of the ABTL units 25–30.

Note in FIG. 5 that ABTL unit 25 tests for broad positive slopes at times when four amplitude-frequency components are made available as shown in the table of FIG. 3. ABTL unit 27 tests for broad positive slopes when amplitude-frequency components $E_1$, $E_2$ and $E_3$ are available and ABTL unit 28 tests for broad positive slopes when $E_{14}$, $E_{15}$, and $E_{16}$ are available. ABTL units 25, 27 and 28 are used separately to test for broad positive slopes due to the individual requirements on threshold level settings.

Similarly, ABTL units 26, 29 and 30 are used to test for broad negative slopes in selected portions of the input spectrum with ABTL unit 26 providing the testing function when four amplitude-frequency components are available, ABTL unit 29 performing the test when amplitude-frequency components $E_1$, $E_2$ and $E_3$ are available and ABTL unit 30 performing the test when amplitude-frequency components $E_{14}$, $E_{15}$ and $E_{16}$ are available.

The ABTL units are constructed by using integrated circuit operational amplifiers along with peripheral components to provide a binary "0" of "1" output signal. Preferably, the binary "0" output signal is clamped at –0.3 volts while the binary "1" output signal is limited to approximately 5 volts. These voltage levels are compatible with most integrated circuit logic elements. The ABTL units 25–30 have the flexibility of accepting any number of inputs and are adjusted so as not to respond to low level noise and borderline signals.

With reference to FIG. 5, means are provided to transfer the amplitude-frequency components from the sample and hold circuits 21–24 to proper ones of the ABTL units 25–30. The means provided for this function is the bank of transfer switches $Sa_1$, $Sa_2$, $Sb_1$, $Sb_2$, $Sc_1$, $Sc_2$, $Sd_1$ $Sd_2$, whose corresponding timing diagrams are shown respectively in FIGS. 6(*f*) to 6(*m*)

Transfer switch $Sa_1$ couples the output signals from sample and hold circuit 21 to a junction point $A_4$ while transfer interval switch $Sa_2$ couples the output signal from sample and hold circuit 23 to a function point $A_2$. Transfer switch $Sb_1$ couples the output signal from sample and hold circuit 22 to a junction point $A_3$, while transfer switch $Sb_2$ couples the output signal from sample and hold circuit 24 to a junction point $A_1$. Transfer switch $Sc_1$ couples the output signal from sample and hold circuit 23 to the junction point $A_4$, while transfer switch $Sc_2$ couples the output signal from sample and hold circuit 21 to the junction point $A_2$. Transfer switch $Sd_1$ couples the output signal from sample and hold circuit 24 to junction point $A_3$ while transfer switch $Sd_2$ couples the output signal from sample and hold circuit 22 to the junction point $A_1$. The ABTL units 25–30 are then appropriately connected to junction points $A_1$–$A_4$.

To illustrate the function of switches $Sa_1$–$Sd_2$, consider the channel timing interval 3 in FIG. 6. At the occurrence of channel time interval 3, sample and hold circuit 21 contains amplitude-frequency component $E_1$, sample and hold circuit 22 contains amplitude-frequency component $E_2$, sample and hold circuit 23 contains amplitude-frequency component $E_3$ and sample and hold circuit 24 contains amplitude-frequency component $E_{16}$ from the previous sequence of multiplexed channels. Since it would be meaningless to use amplitude-frequency components from nonadjacent channels for slope determination, component $E_{16}$ must not be used for the test made during channel time interval 3. At channel time 3 FIGS. 6(*f*), 6(*g*) and 6(*m*) show switches $Sa_1$, $Sa_2$ and $sd_2$ closed simultaneously.

When $Sa_1$ closes, amplitude-frequency component $E_1$ from sample and hold circuit 21 is transferred to the junction point $A_4$. When transfer switch $Sa_2$ closes amplitude-frequency component $E_3$ from sample and hold circuit 23 is transferred to the function point $A_2$, and when transfer switch $Sd_2$ closes amplitude-frequency component $E_2$ from sample and hold circuit 22 is transferred to function point $A_1$. Junction point $A_1$ is connected to the excitatory input, on line 39, of ABTL unit 27, junction point $A_2$ is connected to the excitatory input, on line 40 of ABTL unit 27 and junction point $A_4$ is connected to the inhibitory input on line 41 of ABTL unit 27. Therefore, at the input of ABTL unit 27 amplitude-frequency components $E_2$ and $E_3$ are at the excitatory input terminals and amplitude-frequency component $E_1$ is at the inhibitory input terminal. If the sum of components $E_2$ and $E_3$ is greater than component $E_1$ by a predetermined threshold level, then ABTL unit 27 will generate a binary "1" output signal. If the threshold level is not exceeded, then a binary "0" output signal is generated by ABTL unit 27.

At the same time ABTL unit 27 is testing for the existence of a broad positive slope at channel time 3, ABTL unit 29 is testing for the existence of a broad negative slope in the range of the spectrum encompassed by channels 1–3. ABTL unit 29 is connected to junction points $A_1$, $A_2$ and $A_4$ in a manner such that $E_1$ is on the excitatory input line 47, and $E_2$ and $E_3$ are on the inhibitory input lines 45 and 46 respectively. ABTL unit 29 will generate a pulse corresponding to a "1" if the amplitude of $E_1$ exceeds the sum of the amplitudes of $E_2$ and $E_3$ by a predetermined threshold level indicating the existence of a negative slope in the portion of the spectrum encompassed by channels 1–3; if not, then a pulse corresponding to a "0" will be generated. If ABTL unit 27 and ABTL unit 29 both generate a "0" level pulse at channel time 3, then the portion of the spectrum encompassed by channels 1–3 is flat within a certain range corresponding to the threshold levels set in ABTL units 27 and 29.

During the channel time intervals 4–16 there are four amplitude-frequency components available from sample and hold circuits 21–24 which may be passed through appropriate ones of transfer switches $Sa_1$–$Sd_2$ and by appropriately connecting ABTL units 25 and 26 to junction points $A_1$, $A_2$, $A_3$ and $A_4$, the existence of positive or negative broad slopes will be determined in the portions of the spectrum encompassed by channels corresponding to the four amplitude-frequency components present at a given test time.

After sequentially testing for broad positive or negative slopes during channel times 4–16 where the broad slope equations are satisfied by four amplitude-frequency components from one sixteen component sequence, the existence of broad positive or negative slopes is determined by ABTL units 28 and 30 respectively during channel time interval 1 of the succeeding multiplexed input signal. There are three amplitude-frequency components required to satisfy the broad slope equations during channel time interval 1, of the succeeding sequence of channels, namely $E_{14}$, $E_{15}$ and $E_{16}$. $E_{14}$ is transferred to junction point $A_3$ by closing switch $Sb_1$. $E_{15}$ is transferred to junction point $A_4$ by closing switch $Sc_1$. $E_{16}$ is transferred to junction point $A_1$ by closing switch $Sb_2$.

The broad slope determination is not made during channel time interval 2, since the amplitude-frequency components held in sample and hold circuits 21–25 are respectively $E_1$, $E_2$, $E_{15}$ and $E_{16}$ and there is no correlation with respect to broad slopes from one extreme of the spectrum to the other extreme. To avoid making the slope determination at channel time 2, none of the switches $Sa_1$–$Sd_2$ are closed.

At channel time 3 of the succeeding sequence of incoming channels, the procedure for broad slope determination is repeated.

In many applications it is extremely useful to have the signals representing broad slopes, which have been previously determined, retained for further processing. FIG. 5 shows the manner in which the output signals from the ABTL units 25 and 30 are stored.

ABTL unit 25, which generates a binary "0" or "1" in each channel time in the range of time intervals 4–16 on line 51, has one input terminal from each of 13 AND gates 52–64 coupled to line 51. Each one of the AND gates 52–64 is coupled to one of the flip-flops (bistable multivibrators) 65–77. The binary signals on line 51 are coupled to one input of each of the AND gates 52–64 while the second input signal to each of the AND gates 52–64 is a strobe pulse or timing signal. There are 15 strobe pulses used as input signals to AND gates 52–64 and they are shown in FIG. 6 as strobe pulses 2–14. Strobe signals 2–14 correspond to channel times 4–16 respectively. The flip-flops 65–77 will retain whatever signal is generated in the corresponding one of AND gates 52–64.

To illustrate the memory provided by AND gates 52–64 and flip-flops 55–77, assume ABTL unit 25 generated a binary "1" on line 51 at channel time 4, indicating the existence of a broad positive slope in the area of the spectrum represented by amplitude-frequency components $E_1$–$E_4$. At channel time 4, the only strobe pulse generated is strobe pulse 2. With a positive signal on line 51 and strobe pulse 2 appearing concurrently at the input terminals of AND gate 52, a binary "1" is generated and flip-flop 65 is set to the "1" state and this information is retained and made available at the output terminal of flip-flop 65 on line 78.

In a like manner, the existence of a broad positive slope in selected portions of the spectrum will result in binary "1" signals being made available at output terminals 79–90 when strobe pulses 3–14 occur simultaneously at the appropriate one of AND gates 53–64 with the binary "1" signals on line 51.

Whenever a strobe pulse appears at a particular one of AND gates 52–64 and a binary "0" signal simultaneously occurs at the particular one of AND gates 52–64, the associated one of flip-flops 65–90 will go to the "0" state.

In the very same manner binary signal indications of the existence of broad negative slopes during channel time intervals 4–16 will be retained by the interaction of the output signals from ABTL unit 26 on line 91 coupled to one of the inputs of each of AND gates 92–104, the other input signals to AND gates 92–104 being strobe pulses 2–14 respectively, flip-flops 105–117 are respectively coupled to AND gates 92–104, the output signals from flip-flops 105–117 being coupled to lines 118–130 respectively.

The existence of broad positive slopes determined during channel time 3 is indicated by a binary "1" at the output of ABTL unit 27 on line 131. The signal on line 131 is coupled to one input terminal of AND gate 132. The second input signal to AND gate 132 is strobe pulse 1. Upon a concurrence of pulses at the input terminals of AND gate 132 a "1" state is set in flip-flop 133, which is coupled to AND gate 132, with the retained "1" state being made available on line 134 at the output terminal of flip-flop 133.

Similarly ABTL unit 28 provides binary indications on line 135, which is connected to one input terminal of AND gate 136, the other input signal being strobe pulse 15. AND gate 136 is coupled to flip-flop 137 which makes stored signals available on line 138.

ABTL unit 29 provides binary indications of the existence of broad negative slopes during channel time 3 on line 139 which is connected to one input terminal of AND-gate 140. The other input signal to AND-gate 140 being strobe pulse 1. AND-gate 140 is coupled to flip-flop 141 which makes the stored indication signals in flip-flop 141 available on line 142.

ABTL unit 30 provides binary indications of the existence of broad negative slopes during channel time 1 on line 143 which is connected to one input of AND gate 144. The other input signal to AND gate 144 being strobe pulse 15 AND gate 144 is coupled to flip-flop 145 which makes the stored indication signal held in flip-flop 145 available on line 146.

The stored information signals may now be used in the pattern recognition network 6 for sound and word identification.

What is claimed is:

1. A network adapted to receive time-multiplexed input signals from at least *n* channels, said signals comprising N amplitude-frequency components of a spectrum, *n* being a number in the range of 1 to N, the amplitude-frequency component of each channel corresponding to the amplitude of a specified range of frequencies within said spectrum, for determining whether the slope of a selected portion of said spectrum is positive or negative, said network comprising:

sampling means for sequentially sampling said *n* channels and for providing one of said components from each of said *n* channels; and broad slope determining means coupled to said sampling means for providing a first signal at an output thereof when a first sum of a first plurality of components in corresponding adjacent channels exceeds a second sum of a second plurality of components in corresponding successive adjacent channels by a predetermined threshold level and for providing a second signal at an output thereof when said second sum of components exceeds said first sum of components by a predetermined threshold level.

2. A network as claimed in claim 1 wherein said sampling means comprises;

a plurality of switches;

means for sequentially operating said switches at times corresponding to the time intervals of occurrence of each of said N channels, and a plurality of sample and hold circuits each coupled to one of said plurality of switches for sampling the channel being gated by the corresponding one of said plurality of switches and for retaining the amplitude-frequency component corresponding to said sampled channel for a time corresponding to the time interval between successive operations of said switch coupled thereto.

3. A network adapted to receive a time multiplexed input signal of at least *n* channels representing a spectrum comprising N amplitude-frequency components, *n* being a number in the range of one to N, the amplitude-frequency component of each channel representing the amplitude level in a specified range of frequencies within said spectrum, for determining whether the slope of a selected portion of said spectrum is positive or negative, said network comprising:

a plurality of sampling circuits;

means for sequentially operating said sampling circuits to provide one of said components from each of said channels sampled;

a plurality of holding circuits each operatively coupled to one of said plurality of sampling circuits for retaining said sampled components for a time interval corresponding to the time between operations of the sampling circuit coupled thereto;

first broad slope determining means coupled to said holding circuits for providing a signal at an output thereof representing a broad positive slope in a selected portion of said spectrum when a first sum of a first plurality of components in corresponding adjacent channels exceeds a second sum of a second plurality of components in corresponding successive adjacent channels by a predetermined threshold level, each of said first and said second plurality of components corresponding to said sampled components being retained in said holding circuits; and second broad slope determining means coupled to said holding circuits for providing a signal at an output thereof representing a broad negative slope in said selected portion of said spectrum when said second sum of components exceeds said first sum of components by a predetermined threshold level.

4. A network as claimed in claim 3 wherein a first binary signal is provided at the output of said first broad slope determining means representing a broad positive slope in a selected portion of said spectrum and wherein a second binary signal is provided at the output of said second broad slope determining means representing a broad negative slope in a selected portion of said spectrum, further comprising digital memory means coupled to the outputs of said first and said second broad slope determining means for retaining said first and said second binary signals.

5. A network as claimed in claim 3 wherein there are four of said sampling circuits and at least four of said channels, and wherein the first of said four sampling circuits samples the first of said channels and every fourth channel thereafter, the second sampling circuit samples the second of said channels and every fourth channel thereafter, the third sampling circuit samples the third of said channels and every fourth channel thereafter, the fourth sampling circuit samples the fourth of said channels and every fourth channel thereafter, and wherein after N channels have been sequentially sampled said sampling circuits repeat the same sampling sequence.

6. A network as claimed in claim 5 wherein there are four holding circuits, each holding circuit being coupled to one of said sampling circuits, wherein each holding circuit retains the amplitude-frequency component sampled by the corresponding sampling circuit for four time intervals corresponding to the time between operations of said corresponding sampling circuits.

7. A network as claimed in claim 6 wherein said first broad slope determining means provides an indication signal at an output thereof when the difference between the sum of amplitude-frequency components ($n$+2) and ($n$+1) and the sum of amplitude-frequency components ($n$—1) and ($n$) exceeds a predetermined threshold level, said indication signal representing a broad positive slope in the portion of said spectrum represented by components ($n$) to ($n$+2) and wherein said second broad slope determining means provides another indication signal at an output thereof when the difference between the sum of components ($n$—1) and ($n$) and the sum of components ($n$+1) and ($n$+2) exceeds a predetermined threshold level, said other indication signal representing a broad negative slope in the portion of said spectrum represented by components ($n$) to ($n$+2)

8. A network as claimed in claim 7 wherein said first broad slope determining means comprises:

initial broad positive slope determining means for providing a signal representing the first broad positive slope determined, when component ($n$—1) is nonexistent;

final broad positive slope determining means for providing a signal representing the last broad positive slope determined, when component ($n$+2) is nonexistent; and intermediary broad positive slope determining means for providing a signal representing broad positive slopes when amplitude-frequency components ($n$—1), ($n$), ($n$+1) and ($n$+2) are all present;

and wherein said second broad slope determining means comprises:

initial broad negative slope determining means for providing a signal representing the first broad negative slope determined, when component ($n$—1) is nonexistent;

final broad negative slope determining means for providing a signal representing the last broad negative slope determined, when component ($n$+2) is nonexistent; and intermediary broad negative slope determining means for providing a signal representing broad negative slopes when amplitude-frequency components ($n$—1), ($n$), ($n$+1) and ($n$+2) are all present.

9. A network adapted to receive at least $n$ channels of information representing an input signal pattern, said pattern being characterized by a first parameter being a function of a second parameter, and wherein said input signal pattern comprises N first parameter components, $n$ being a number in the range of one to N, said first parameter component of each channel representing the first parameter level in a specified range of second parameters within said pattern, for determining whether the slope in a selected portion of said pattern is positive or negative, said network comprising:

sampling means for sequentially sampling $n$ channels having first parameter components and for providing one of said first parameter components from each of said sampled channels at an output thereof; and broad slope determining means coupled to said sampling means for providing a first signal at an output thereof when a first sum of a first plurality of components in corresponding adjacent pattern channels exceeds a second sum of a second plurality of components in corresponding successive adjacent pattern channels by a predetermined threshold level and for providing a second signal at an output thereof when said second sum exceeds said first sum by a predetermined threshold level.

10. A network as claimed in claim 9 wherein said first and second signals are binary signals.

* * * * *

Disclaimer 3,619,509.—*James Robert Barger*, Haddon Heights, and *Phillips Brooks Scott*, Haddonfield, N.J. BROAD SLOPE DETERMINING NETWORK. Patent dated Nov. 9, 1971. Disclaimer filed May 4, 1972, by the assignee, *RCA Corporation.*

Hereby enters this disclaimer to all claims of said patent.

[*Official Gazette February 19, 1974.*]